United States Patent
Bennett et al.

[11] Patent Number: 5,950,969
[45] Date of Patent: Sep. 14, 1999

[54] FRAME FOR SIGN

[75] Inventors: Robert Neal Bennett, Hextable;
Anthony Dennis Elgar, Mitcham;
Brian Thomas Sales, Dorking, all of
United Kingdom

[73] Assignee: British Gas plc, London, United Kingdom

[21] Appl. No.: 08/362,564

[22] PCT Filed: May 6, 1994

[86] PCT No.: PCT/GB94/00988

§ 371 Date: Mar. 17, 1995

§ 102(e) Date: Mar. 17, 1995

[87] PCT Pub. No.: WO94/26983

PCT Pub. Date: Nov. 24, 1994

[30] Foreign Application Priority Data

May 6, 1993 [GB] United Kingdom .................... 9309365

[51] Int. Cl.⁶ .................................. A47F 1/14; G09F 7/02
[52] U.S. Cl. ........................... 248/127; 248/472; 40/610; 40/612
[58] Field of Search ..................... 248/127, 175, 248/469, 472, 460; 40/610, 612; 116/63 P, 63 T; 256/64, 12.5, 13.1; 404/6

[56] References Cited

U.S. PATENT DOCUMENTS

| | | |
|---|---|---|
| 2,235,281 | 3/1941 | Carver ..................................... 248/472 |
| 2,702,955 | 3/1955 | Oliver . |
| 3,343,778 | 9/1967 | Levine ................................. 248/175 X |
| 3,360,226 | 12/1967 | Nicholas .............................. 248/460 X |
| 3,692,281 | 9/1972 | Clayton . |
| 3,800,735 | 4/1974 | Simpson ................................ 116/63 T |
| 4,091,555 | 5/1978 | Korzon ................................. 248/469 X |
| 4,483,505 | 11/1984 | Dalbo .................................. 248/460 X |

FOREIGN PATENT DOCUMENTS

| | | |
|---|---|---|
| 0 005 957 | 5/1979 | European Pat. Off. . |
| 1 200 085 | 8/1956 | France . |
| 1 593 777 | 11/1968 | France . |
| 1 001 138 | 6/1954 | Germany . |
| 1935 902 | 6/1969 | Germany . |
| 2 148 360 | 6/1984 | United Kingdom . |
| 2 186 729 | 2/1986 | United Kingdom . |
| 2 249 531 | 10/1991 | United Kingdom . |

*Primary Examiner*—Leslie A. Braun
*Assistant Examiner*—Anita M. King
*Attorney, Agent, or Firm*—Larson & Taylor

[57] ABSTRACT

A frame for supporting a sign comprises three members which are interconnectable in such a way as to form a three-sided figure with one side forming a base and at least one of the other sides forming a mounting for the sign, each member being in the form of a hoop of tubular section.

4 Claims, 3 Drawing Sheets

FRAME FOR SIGN

BACKGROUND OF THE INVENTION

The present invention relates to a frame for supporting a sign and in particular though not exclusively a sign used to provide a warning of roadworks or other excavations.

DESCRIPTION OF THE PRIOR ART

Utilities and local authorities are now statutorily obliged to provide signs warning both car-users and pedestrians of roadworks and other excavations. The signs which may be triangular flat plastic sheets are mounted on frames usually of steel. One type of frame has a sign-supporting face to which the sign is attached or mounted together with supporting legs for holding the sign upright.

The present variety of frames are expensive and as they are frequently removed or damaged by vandals the cost of replacement can be prohibitive.

It is an object of the present invention to provide a frame which is less expensive than the present frames so that the cost of replacing lost and damaged frames is reduced.

SUMMARY OF THE INVENTION

According to the present invention we provide a frame for supporting a sign, the frame comprising three members which are interconnectable in such a way as to form a three-sided figure with one side forming a base and at least one of the other sides forming a mounting for the sign.

Preferably at least one of the frame sides is disconnectable from an adjacent side to enable the frame to be collapsible.

Suitably each member is in the form of a hoop which conveniently is of tubular section.

The hoop may be of polyethylene.

Preferably the hoops are of different diameters so that on collapse the hoops rest one within another.

BRIEF DESCRIPTION OF THE DRAWING

An embodiment of the invention will now be particularly described with reference to the accompanying drawings in which.

DESCRIPTION OF THE PREFERRED EMBODIMENTS

Figure 1:
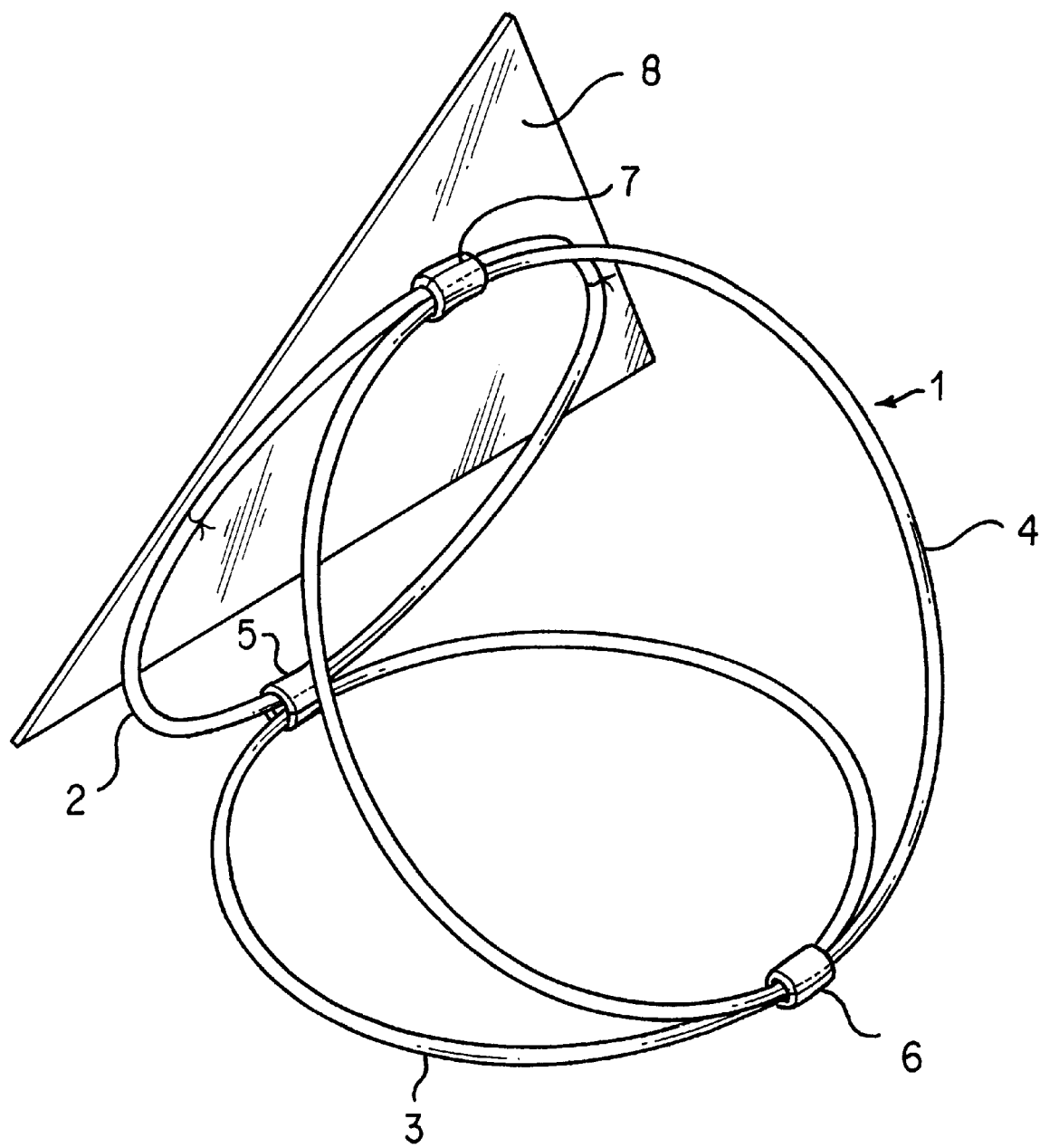
FIG. 1 is a view from the rear and to one side of an assembled frame.

Referring to the drawings, the frame 1 comprises three hoops 2, 3 and 4 which are interconnected to each other by means of connectors 5, 6 and 7 as shown in FIG. 1. Each hoop is made of a tubular plastic material such as polyethylene. This may take the form of a length of pipe the ends of which are welded together to form the hoop. The pipe, preferably of 25 mm external diameter, may be waste or scrap gas service pipe material used to replace or renew existing metallic service pipes. Thus the manufacturing cost of the frame can be negligible. The hoops are of different diameters, hoop 2 being of the smallest diameter, hoop 3 being of intermediate diameter and hoop 4 being of the largest diameter so that the hoops can form a nest on collapse as will be described.

Each connector 5 and 6 comprises a tubular stub sleeve of a suitable plastic material such as polyethylene into which the hoops fit and which in the case of connector 5 effects a permanent connection between hoops 2 and 3 and in the case of connector 6 effects a permanent connection between hoops 3 and 4.

Figure 2:
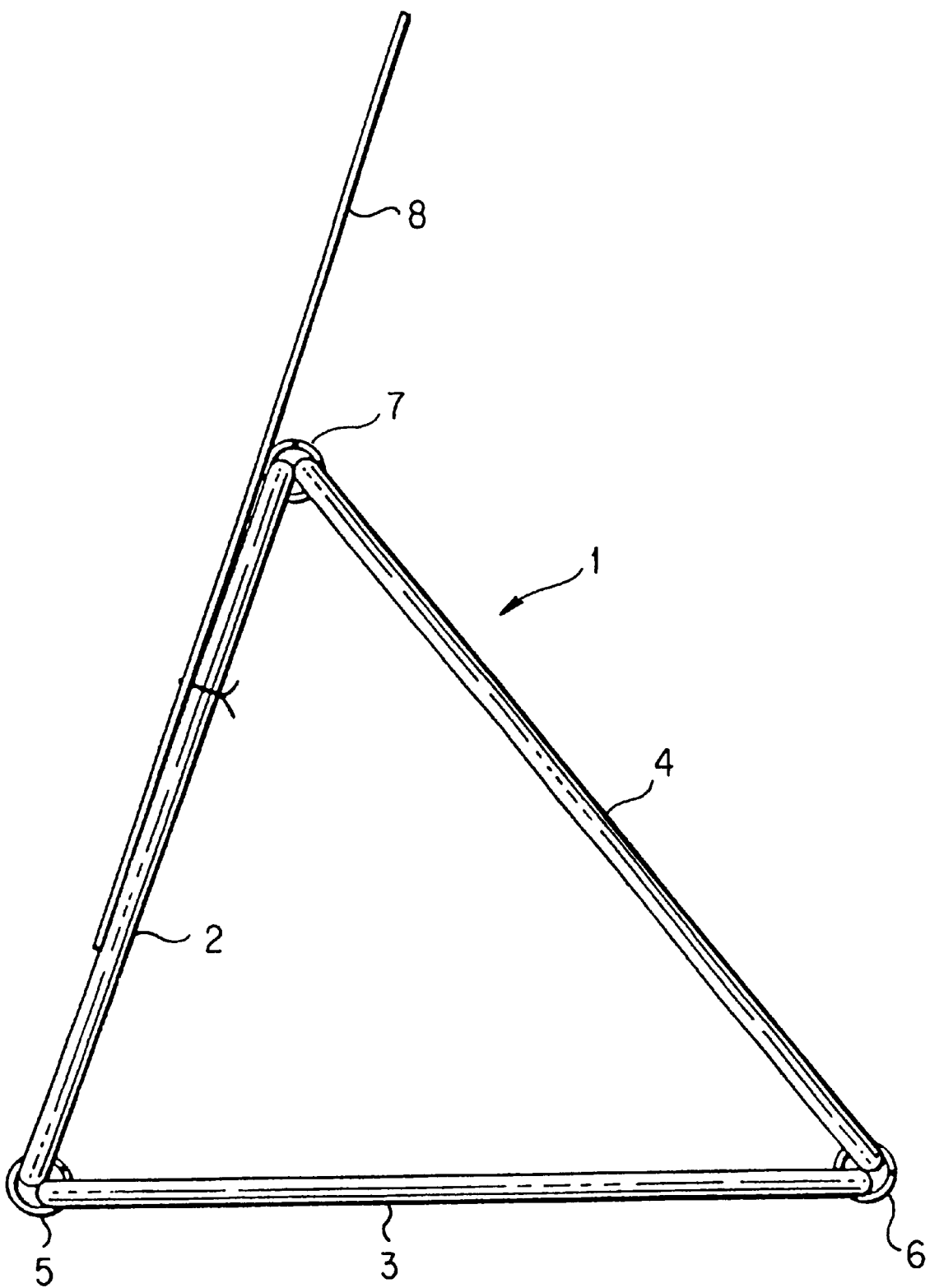
FIG. 2 is a view of a side of the assembled frame.
Figure 3:
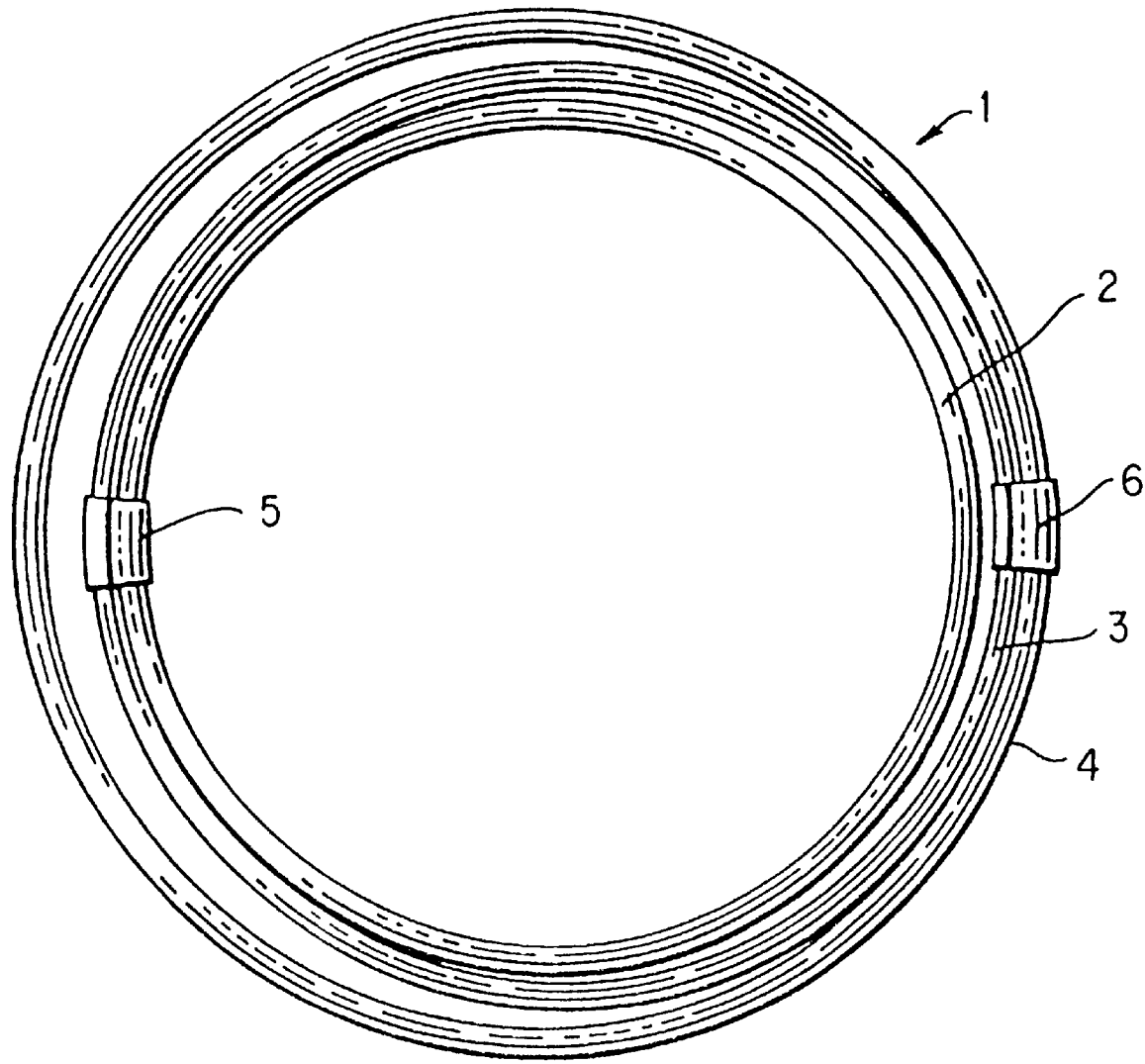
FIG. 3 is a view from above and to one side of a collapsed or folded down frame after or before use.

The connector 7 is in the form of a releasable clip which releasably connects hoop 2 to hoop 4 so that the frame 1 can be assembled into the triangular shaped construction viewed end on as seen in FIG. 2. On release of the clip 7, the hoop 2 is lowered inside the hoop 3 and then hoop 4 is lowered to surround the other two hoops 2, 3 so that a nest is formed as shown in FIG. 3 for transport or storage of the frame as the case may be.

After assembly of the frame 1, a conventional warning triangle 8 in the form of a flat, plastic sheet can be tied to one or other of the non-ground engaging hoops (hoop 2 in FIGS. 1 and 2).

We claim:

1. A frame for supporting a sign comprises three members which are interconnectable in such a way as to form a three-sided figure with one side forming a base and at least one of the other sides forming a mounting for the sign, each member being in the form of a hoop of tubular section, and at least one of the sides being disconnectable from an adjacent side to enable the frame to be collapsible, the hoops being of different diameters so that on collapse the hoops nest co-planarly one within another.

2. A frame for supporting a sign comprising three members which are interconnectable in such a way as to form a three-sided figure with one side forming a base and at least one of the other sides forming a mounting for the sign, each member being in the form of a hoop, each hoop being of tubular section and wherein at least one of said hoops is adapted to nest co-planarly within another of said hoops.

3. A frame as claimed in claim 2, in which as least one of the sides is disconnectable from an adjacent side to enable the frame to be collapsible.

4. A frame as claimed in any of the preceding claims in which each hoop is of polyethylene material.

* * * * *